US012225321B2

(12) United States Patent
Wang et al.

(10) Patent No.: US 12,225,321 B2
(45) Date of Patent: Feb. 11, 2025

(54) VALIDATION OF INFRARED (IR) CAMERA DISTORTION ACCURACY

(71) Applicant: GM Cruise Holdings LLC, San Francisco, CA (US)

(72) Inventors: Yongjun Wang, Pleasanton, CA (US); Marco Antonio Gaxiola Michel, San Francisco, CA (US); Daniel Chou, San Diego, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/244,884

(22) Filed: Sep. 11, 2023

(65) Prior Publication Data

US 2023/0421720 A1 Dec. 28, 2023

Related U.S. Application Data

(63) Continuation of application No. 17/537,009, filed on Nov. 29, 2021, now Pat. No. 11,792,356.

(51) Int. Cl.
*H04N 5/33* (2023.01)
*G06T 7/80* (2017.01)
*H04N 5/208* (2006.01)
*H04N 25/67* (2023.01)

(52) U.S. Cl.
CPC ............... *H04N 5/33* (2013.01); *H04N 5/208* (2013.01); *H04N 25/67* (2023.01)

(58) Field of Classification Search
CPC .................................. H04N 5/33; G06T 7/80
USPC .......................................................... 348/164
See application file for complete search history.

(56) References Cited

U.S. PATENT DOCUMENTS 5,966,208 A * 10/1999 Samuelson .......... H04N 17/002
356/124
8,368,760 B1 * 2/2013 Bates .................... G09G 3/344
359/290

OTHER PUBLICATIONS

Tang; "High-precision camera distortion measurements with a "calibration harp"" Optical Society of America (Year: 2012).*

* cited by examiner

*Primary Examiner* — Jeffery A Williams
(74) *Attorney, Agent, or Firm* — Dimitri Kirimis (57) ABSTRACT

The present technology is directed to determining an accuracy of an infrared (IR) camera, and more particularly, validating a distortion accuracy of an IR camera. The present technology can receive one or more images of a calibration harp captured by the IR camera, wherein the one or more images include a plurality of lines corresponding to a plurality of strings of the calibration harp. The present technology can further determine a degree of distortion of the plurality of lines based on a distortion error coefficient, wherein the distortion error coefficient is computed based on edge points of the plurality of lines on the one or more images.

18 Claims, 6 Drawing Sheets

VALIDATION OF INFRARED (IR) CAMERA DISTORTION ACCURACY

CROSS-REFERENCE TO RELATED APPLICATIONS

This application is a continuation of U.S. Non-Provisional patent application Ser. No. 17/537,009, entitled "VALIDATION OF INFRARED (IR) CAMERA DISTORTION ACCURACY", filed on Nov. 29, 2021, the contents of which are incorporated herein by reference in their entirety and for all purposes.

TECHNICAL FIELD

The subject matter of this disclosure relates in general to the field of sensor calibration and distortion detection, and more particularly, to systems and methods for determining the accuracy of an infrared (IR) camera.

BACKGROUND

An autonomous vehicle is a motorized vehicle that can navigate without a human driver. An exemplary autonomous vehicle includes a plurality of sensor systems, such as but not limited to, a camera sensor system, light detection and ranging (LIDAR) sensor system, or a radio detection and ranging (RADAR) sensor system, amongst others, wherein the autonomous vehicle operates based upon sensor signals output by the sensor systems.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A wide range of defects or discrepancies can exist in vehicles or sensors. For example, a lens of a camera may be warped slightly (or include some other imperfection) that may create distortion in the images captured by the camera.

Some vehicles use multiple sensors of the same given type so that the vehicle has a larger field of view than a single such sensor would ordinarily provide. In such cases, the different sensors of the given type may each be slightly different. All of these differences between different sensors of a given type on a particular vehicle can lead to differences in sensor measurements across the vehicle's field of view that are not representative of reality.

Generally, when cameras map 3-D objects or scenes into 2-D image planes through a camera projection matrix, distortions in images may occur, for example where straight lines in 3-D appear curved or non-linear. Such distortions may be captured and corrected by camera calibration. The camera calibration involves estimating intrinsic and/or extrinsic parameters, for example, estimating the parameters of a lens and image sensor of the camera to correct for distortions, measure the size of an object captured in the image, or determine the location of the camera in the scene. Such parameters can be estimated based on multiple images of a calibration pattern, such as a checkerboard. Then, reprojection errors (e.g., discrepancies based on the images of the checkerboard) and the parameter estimation errors can be evaluated based on the parameters to determine the accuracy of the estimated parameters.

However, common IR camera calibration metrics (e.g., reprojection errors, variance, repeatability) are not sufficient in evaluating the accuracy. Aspects of the disclosed technology address the foregoing limitations by providing solutions for determining the accuracy of an IR camera and further validating the distortion accuracy of the IR camera.

DESCRIPTION

Figure 1:
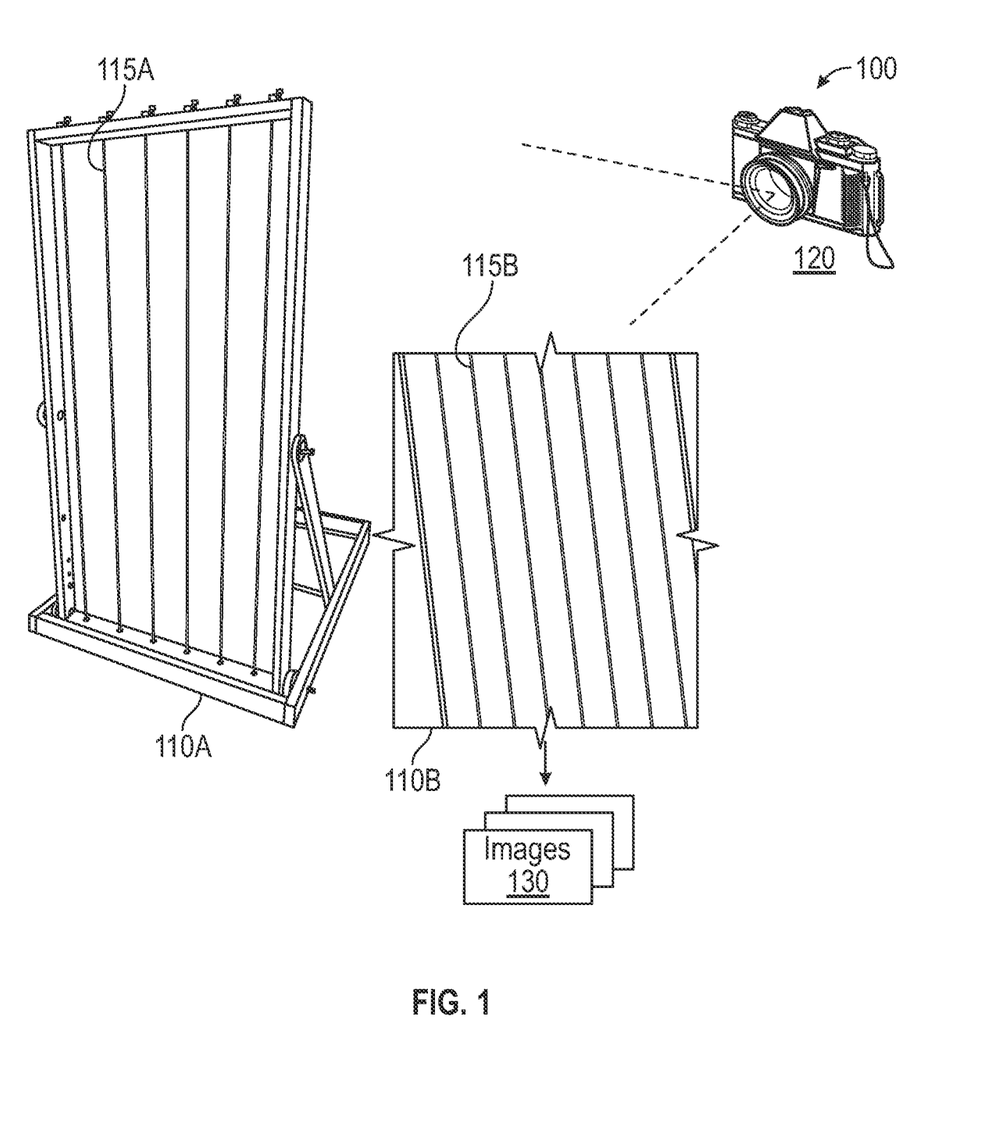
FIG. 1 illustrates an example sensor distortion detection system for an Infrared (IR) camera for determining the accuracy of the IR camera, according to some aspects of the present technology.

FIG. 1 illustrates an example sensor distortion detection system for an IR camera 100 for determining the accuracy of the IR camera, according to some aspects of the present technology.

According to some examples, sensor distortion detection system for an IR camera 100 includes a pattern 110A, which is sometimes referred to as a calibration harp" 110A, for distortion accuracy verification, which may be captured in one or more images 130 by an IR camera (e.g., a long-wavelength IR camera) 120. In some instances, one of the one or more images 130 may include image 110B including a plurality of lines 115B.

In some examples, calibration harp 110A includes a plurality of strings 115A, which are purposely linear and straight. Furthermore, in some examples, the plurality of strings 115A of the calibration harp 110A are under tension to ensure that the strings are maintained straight.

In general, distortions may be described as non-linear deformation that deviates a camera from the projection. Since the alignment (e.g., straight lines) is one of the properties that may be preserved in the projection, the straightness of the projection of straight lines can be measured to evaluate the distortion. As such, the straighter the strings (e.g., plurality of strings 115A of calibration harp 110A), the more accurate evaluation of the distortion using a captured image 130 of strings 115A. In some instances, the strings are defined straight when the strings are extended uniformly without any curve or bend.

While some visual cameras reply on light being reflected back off a calibration harp, the calibration harp at room temperature would be normally invisible to an IR camera. In some examples, the calibration harp may be connected to an electrical source so that current can be run through the plurality of strings (e.g., plurality of strings 115A). Then, the resistance of the current in the plurality of strings may generate heat that can be captured by the IR camera (e.g., IR camera 120), as shown in image 110B.

Figure 2:
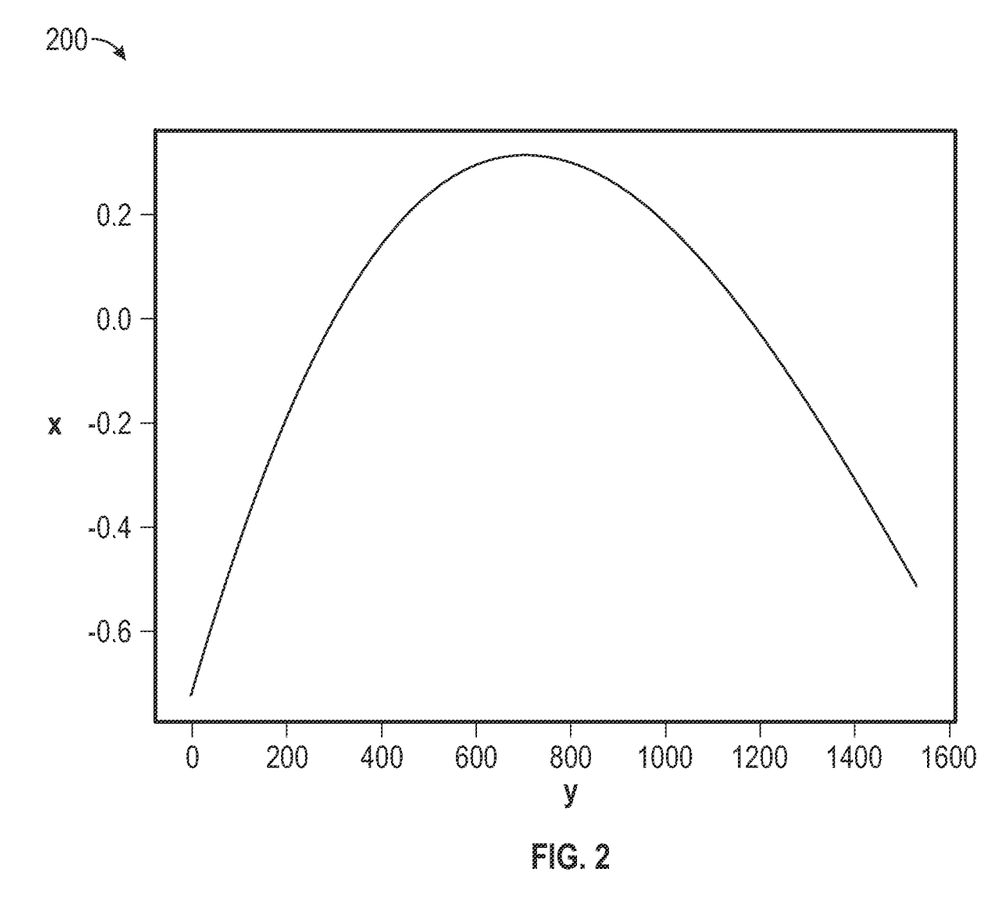
FIG. 2 illustrates an example graph of a distortion error coefficient, according to some aspects of the present technology.

FIG. 2 illustrates an example graph 200 of a distortion error coefficient, according to some aspects of the present technology. According to some examples, a degree of distortion can be determined based on a distortion error coefficient, which can be computed based on edge points of the plurality of lines on the images of the calibration harp (e.g., calibration harp 110A in FIG. 1) captured by the IR camera (e.g., IR camera 120 in FIG. 1).

In some examples, the distortion error coefficient can be calculated based on a difference between maximum and minimum values of a non-linear line of the plurality of lines. For example, a straight line remains straight in a distortion-free image. Therefore, any curvature can be an indicator of lens distortion effects. In some examples, a residual distortion error, after distortion correction with the distortion error coefficient, can be defined as a maximum value of the curvature (i.e., bending) in lines in the distortion-free image (e.g., corrected imaged).

As shown in FIG. 2, graph 200 illustrates the curvature on y-axis in pixels (e.g., ranging from −0.8 to 0.4) across the detected line on x-axis in pixels (e.g., ranging from 0 to 1600). The residual distortion error can be defined as the difference (i.e., delta value) between the maximum and minimum of the curve plotted in graph 200.

Figure 3:
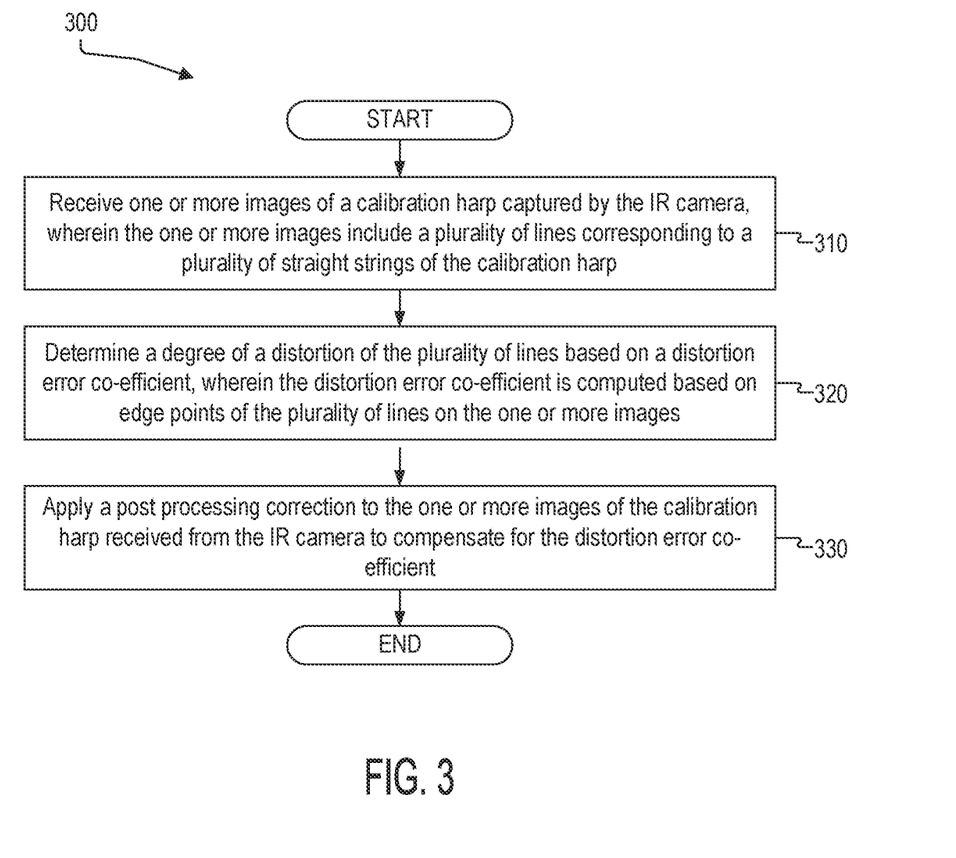
FIG. 3 is a flowchart of an example method for determining the accuracy of the IR camera, according to an example of the instant disclosure.

FIG. 3 illustrates an example method 300 for determining the accuracy of an IR camera, more particularly, validating the distortion accuracy of the IR camera. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes receiving one or more images of a calibration harp captured by the IR camera at step 310. For example, the sensor distortion detection system for an IR camera 100 illustrated in FIG. 1 may receive one or more images 130 of calibration harp 110A captured by IR camera 120 in FIG. 1. In some examples, one or more images 130 of calibration harp 110A captured by IR camera 120 may resemble image 110B.

According to some examples, the calibration harp is connected to an electrical source whereby the plurality of lines give off heat due to the electrical resistance of the plurality of lines of the calibration harp, which can be captured by the IR camera. For example, calibration harp 110A may be connected to an electrical source that can run current through the plurality of strings 115A. Then, the resistance of the current in the plurality of strings 115A may give off heat, which can be captured by IR camera 120. In some instances, the plurality of strings 115A, after current is applied through the strings, may appear as the plurality of lines 115B as shown in image 110B captured by the IR camera 120. In short, without application of current to the plurality of lines 115B, the plurality of lines 115B would remain at or near room temperature such that they would not be noticeable in an image 130 from the IR camera 120. However, application of current through the plurality of lines 115B produces heat in the plurality of lines 115B significantly above ambient room temperature based on the resistance of the plurality of lines 115B such that the heat associated with the plurality of lines 115B can be captured by the IR camera 120. Accordingly, the current in the plurality of lines 115B and/or the type and corresponding resistance of the plurality of lines 115B can be adjusted to produce enough heat to be visible in images 130 produced by the IR camera 130.

In some examples, each of the plurality of strings of the calibration harp may be sized to correspond to one-pixel width of the IR camera in each of the one or more images. For example, calibration harp 110A illustrated in FIG. 1 may have a plurality of strings 115A that corresponds to one-pixel width in the captured image.

In some instances, the calibration harp maintains the plurality of strings under tension, thereby ensuring the strings are straight. As described previously, to obtain an accurate evaluation of the distortion, the calibration harp may maintain the plurality of strings under tension so that the strings are kept straight and the lines captured in the image by the IR camera may be less affected by the non-linearity of the strings. Examples of tension can include but are not limited to force exerted on the string being within a specified range or above a threshold or frequency of the string when plucked being within a specified range or above a threshold.

For example, as previously described, calibration harp 110A maintains the plurality of strings 115A under tension to keep the plurality of strings 115A as straight as possible so that an accurate evaluation of the distortion (i.e., less deformation of the straight lines) can be obtained.

In some examples, as previously described, the one or more images include a plurality of lines corresponding to a plurality of strings of the calibration harp. For example, one or more images 130 include a plurality of lines 115B that correspond to the plurality of strings 115A.

In some instances, the one or more images include images of the calibration harp taken from multiple angles so that most of the portions, if not all, of the calibration harp including the plurality of strings can be captured by the IR camera.

In some examples, the one or more images include images of each of the four corners of the calibration harp. Since distortions tend to appear around the edges or corners of an image, to evaluate those areas that are prone to distortions, the one or more images can be captured, by the IR camera, to include each of the four corners of the calibration harp. With the entire view of the four corners of the calibration harp, the intrinsic evaluation of distortions can be performed more accurately.

In some examples, the one or more images include images taken from images of the calibration harp at different distances and poses relative to the IR camera. For example, distances and/or poses between the calibration harp and the IR camera can adjusted, by re-positioning either the calibration harp or the IR camera, to obtain various images of the calibration harp across the whole field of view of the IR camera for an accurate evaluation of distortions.

According to some examples, the method 300 includes determining a degree of distortion of the plurality of lines based on a distortion error coefficient at step 320. For example, the sensor distortion detection system for an IR camera 100 illustrated in FIG. 1 may determine a degree of distortion of the plurality of lines based on a distortion error coefficient.

In some examples, the distortion error coefficient may be computed based on edge points of the plurality of lines on the one or more images. For example, edge points of the plurality of lines on the image of the calibration harp can be determined and further used to compute a distortion error co-efficient.

In some examples, the distortion error coefficient can be a root-mean square (RMS) distance. For example, the distortion may be evaluated as the RMS distance from the edge points belonging to the same line segment (for example, as appears on the one or more images) to their corresponding regression line based on a curve fitting tool. The curve fitting tool may fit a polynomial predictive model to data (e.g., the detected line or curve) and output a model coefficient after optimizing the difference between the polynomial predictive model and the data (e.g., the detected line or curve).

In some examples, the distortion error coefficient is a difference between maximum and minimum of a non-linear line of the plurality of lines. As shown in FIG. 2, the distortion error coefficient is based on the difference between maximum and minimum values of a non-linear line of the plurality of lines (e.g., plurality of lines 115B in FIG. 1).

According to some examples, the method 300 includes applying a post-processing correction to the one or more images of the calibration harp received from the IR camera to compensate for the distortion error coefficient at step 330. For example, the sensor distortion detection system for an IR camera 100 illustrated in FIG. 1 may further comprise a post-correction processor (not shown in FIG. 1), which may apply a post-processing correction to the one or more images of the calibration harp received from the IR camera to compensate for the distortion error coefficient. In some instances, the post-processing correction may include applying a distortion coefficient from calibrations to the target image in order to correct error(s) associated with the lens distortion. Also, any remaining error(s) after this post-processing correction may be an indicator of a calibration inaccuracy.

Figure 4:
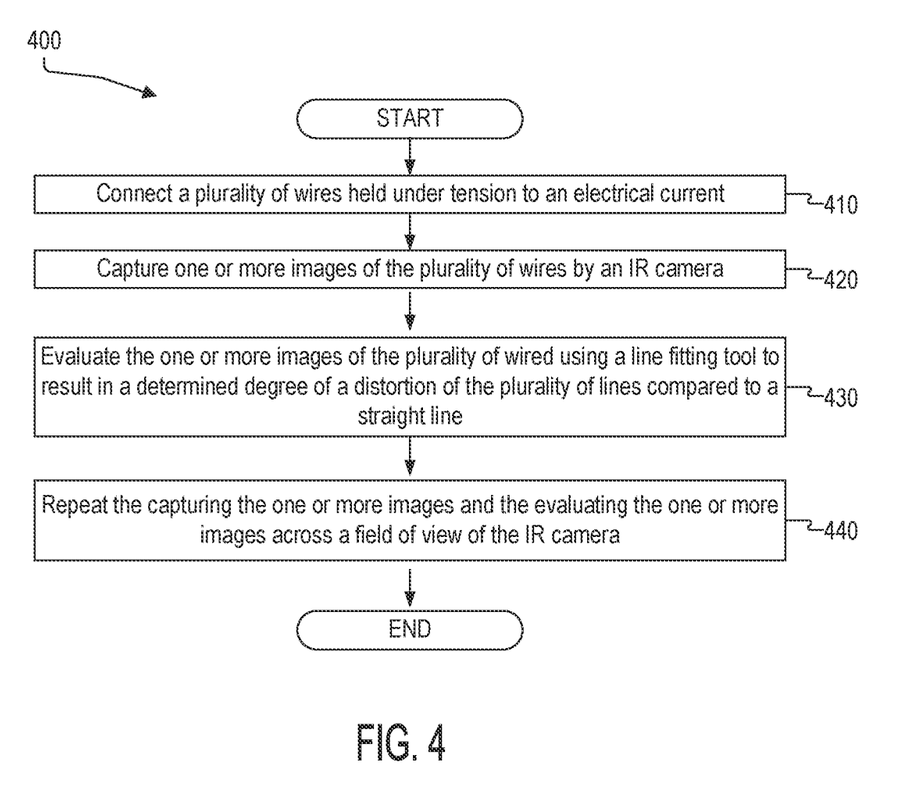
FIG. 4 is a flowchart of another example method for determining the accuracy of the IR camera, according to an example of the instant disclosure.

FIG. 4 illustrates another example method 400 for determining the accuracy of an IR camera. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes connecting a plurality of wires (i.e., strings) held under tension to an electrical current at step 410. For example, the sensor distortion detection system for an IR camera 100 illustrated in FIG. 1 may connect a plurality of strings 115A held under tension to an electrical current. In some examples, the plurality of strings held under tension is a calibration harp (e.g., calibration harp 110A in FIG. 1).

According to some examples, the method 400 includes capturing one or more images of the plurality of wires by an IR camera at step 420. For example, the sensor distortion detection system for an IR camera 100 illustrated in FIG. 1 may capture one or more images (e.g., images 130 in FIG. 1) of the plurality of wires by an IR camera (e.g., IR camera 120 in FIG. 1).

According to some examples, the method 400 includes evaluating the one or more images of the plurality of wires using a line fitting tool to result in a determined degree-of-distortion of the plurality of lines compared to a straight line at step 430. For example, the sensor distortion detection system for an IR camera 100 illustrated in FIG. 1 may evaluate the one or more images 130 of the plurality of strings 115A (i.e., wires) using a line fitting tool to result in a determined degree of distortion of the plurality of lines 115B compared to a straight line.

According to some examples, the method 400 includes repeating the capturing the one or more images and the evaluating the one or more images across a field of view of the IR camera at step 440. For example, the sensor distortion detection system for an IR camera 100 illustrated in FIG. 1 may repeat the capturing of the one or more images 130 (step 420) and the evaluation of the one or more images across a field of view of the IR camera (step 430).

In some examples, the capturing the one or more images and the evaluating the one or more images across the field of view of the IR camera are repeated while positioning the calibration harp at different distances and poses relative to the IR camera. For example, the calibration harp can be positioned at different distances and poses relative to the IR camera. The same can be achieved by re-positioning the IR camera. By capturing images of the calibration harp including the plurality of wires at different distances and poses, multiple images at various angles and positions can provide an accurate evaluation of more portions, if not the entire portion, of the plurality of wires to determine the distortion accuracy.

Figure 5:
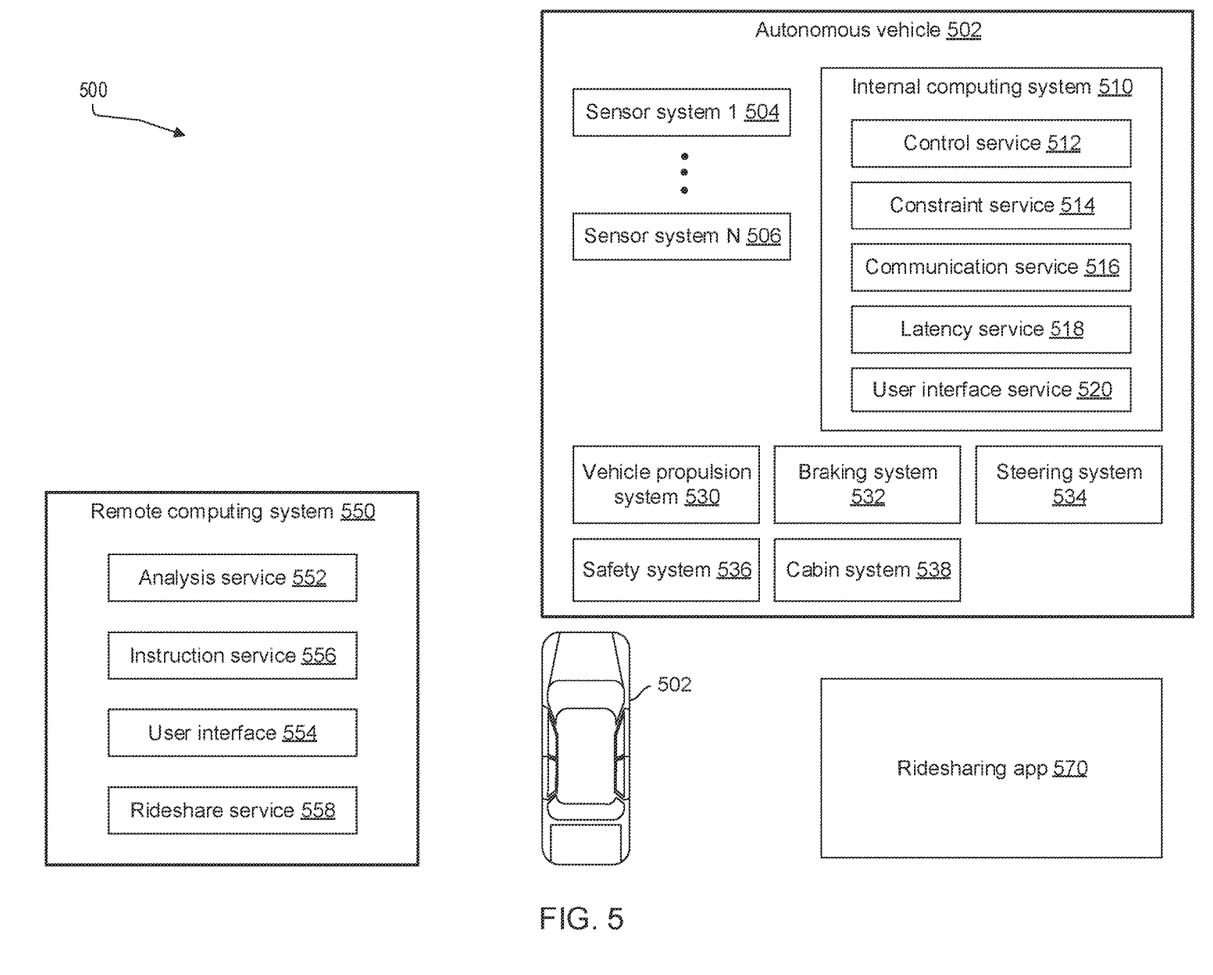
FIG. 5 illustrates an example autonomous vehicle environment including a computing system in communication with an autonomous vehicle, in accordance with some examples.

FIG. 5 illustrates environment 500 that includes an autonomous vehicle 502 in communication with a computing system 550.

The autonomous vehicle 502 can navigate about roadways without a human driver based upon sensor signals output by sensor systems 504-506 of the autonomous vehicle 502. The autonomous vehicle 502 includes a plurality of sensor systems 504-506 (a first sensor system 504 through an Nth sensor system 506). The sensor systems 504-506 are of different types and are arranged about the autonomous vehicle 502. For example, the first sensor system 504 may be a camera sensor system and the Nth sensor system 506 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 502 further includes several mechanical systems that are used to effectuate appropriate motion of the autonomous vehicle 502. For instance, the mechanical systems can include but are not limited to, a vehicle propulsion system 530, a braking system 532, and a steering system 534. The vehicle propulsion system 530 may include an electric motor, an internal combustion engine, or both. The braking system 532 can include an engine brake, brake pads, actuators, and/or any other suitable componentry that is configured to assist in decelerating the autonomous vehicle 502. The steering system 534 includes suitable componentry that is configured to control the direction of movement of the autonomous vehicle 502 during navigation.

The autonomous vehicle 502 further includes a safety system 536 that can include various lights and signal indicators, parking brake, airbags, etc. The autonomous vehicle 502 further includes a cabin system 538 that can include cabin temperature control systems, in-cabin entertainment systems, etc.

The autonomous vehicle 502 additionally comprises an internal computing system 510 that is in communication with the sensor systems 504-506 and the mechanical systems 530, 532, 534. The internal computing system includes at least one processor and at least one memory having computer-executable instructions that are executed by the processor. The computer-executable instructions can make up one or more services responsible for controlling the autonomous vehicle 502, communicating with remote computing system 550, receiving inputs from passengers or human co-pilots, logging metrics regarding data collected by sensor systems 504-506 and human co-pilots, etc.

The internal computing system 510 can include a control service 512 that is configured to control operation of the vehicle propulsion system 530, the braking system 532, the steering system 534, the safety system 536, and the cabin system 538. The control service 512 receives sensor signals from the sensor systems 504-506 as well communicates with other services of the internal computing system 510 to effectuate operation of the autonomous vehicle 502. In some embodiments, control service 512 may carry out operations in concert one or more other systems of autonomous vehicle 502.

The internal computing system 510 can also include a constraint service 514 to facilitate safe propulsion of the autonomous vehicle 502. The constraint service 516 includes instructions for activating a constraint based on a rule-based restriction upon operation of the autonomous vehicle 502. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 512.

The internal computing system 510 can also include a communication service 516. The communication service can include both software and hardware elements for transmitting and receiving signals from/to the remote computing system 550. The communication service 516 is configured to transmit information wirelessly over a network, for example, through an antenna array that provides personal cellular (long-term evolution (LTE), 3G, 5G, etc.) communication.

In some embodiments, one or more services of the internal computing system 510 are configured to send and receive communications to remote computing system 550 for such reasons as reporting data for training and evaluating machine learning algorithms, requesting assistance from remoting computing system or a human operator via remote computing system, software service updates, ridesharing pickup and drop off instructions etc.

The internal computing system 510 can also include a latency service 518. The latency service 518 can utilize timestamps on communications to and from the remote computing system 550 to determine if a communication has been received from the remote computing system 550 in time to be useful. For example, when a service of the internal computing system 510 requests feedback from remote computing system 550 on a time-sensitive process, the latency service 518 can determine if a response was timely received from remote computing system 550 as information can quickly become too stale to be actionable. When the latency service 518 determines that a response has not been received within a threshold, the latency service 518 can enable other systems of autonomous vehicle 502 or a passenger to make necessary decisions or to provide the needed feedback.

The internal computing system 510 can also include a user interface service 520 that can communicate with cabin system 538 in order to provide information or receive information to a human co-pilot or human passenger. In some embodiments, a human co-pilot or human passenger may be required to evaluate and override a constraint from constraint service 514, or the human co-pilot or human passenger may wish to provide an instruction to the autonomous vehicle 502 regarding destinations, requested routes, or other requested operations.

As described above, the remote computing system 550 is configured to send/receive a signal from the autonomous vehicle 502 regarding reporting data for training and evaluating machine learning algorithms, requesting assistance from remoting computing system or a human operator via the remote computing system 550, software service updates, ridesharing pickup and drop off instructions, etc.

The remote computing system 550 includes an analysis service 552 that is configured to receive data from autonomous vehicle 502 and analyze the data to train or evaluate machine learning algorithms for operating the autonomous vehicle 502. The analysis service 552 can also perform analysis pertaining to data associated with one or more errors or constraints reported by autonomous vehicle 502.

The remote computing system 550 can also include a user interface service 554 configured to present metrics, video, pictures, sounds reported from the autonomous vehicle 502 to an operator of remote computing system 550. User interface service 554 can further receive input instructions from an operator that can be sent to the autonomous vehicle 502.

The remote computing system 550 can also include an instruction service 556 for sending instructions regarding the operation of the autonomous vehicle 502. For example, in response to an output of the analysis service 552 or user interface service 554, instructions service 556 can prepare instructions to one or more services of the autonomous vehicle 502 or a co-pilot or passenger of the autonomous vehicle 502.

The remote computing system 550 can also include a rideshare service 558 configured to interact with ridesharing applications 570 operating on (potential) passenger computing devices. The rideshare service 558 can receive requests to be picked up or dropped off from passenger ridesharing app 570 and can dispatch autonomous vehicle 502 for the trip. The rideshare service 558 can also act as an intermediary between the ridesharing app 570 and the autonomous vehicle wherein a passenger might provide instructions to the autonomous vehicle to 502 go around an obstacle, change routes, honk the horn, etc.

Figure 6:
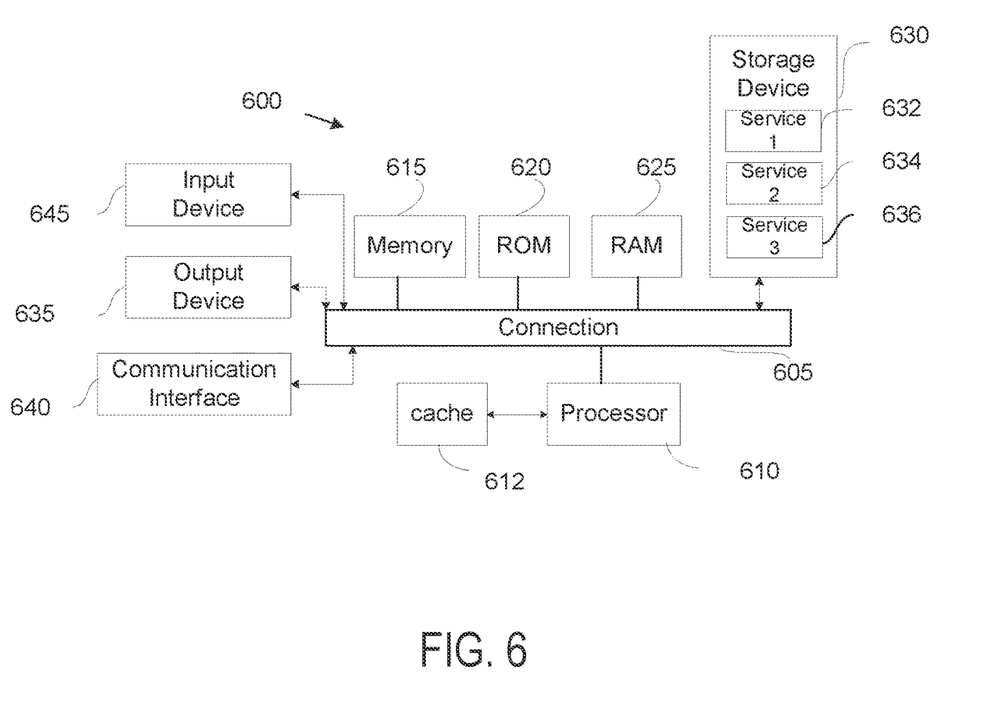
FIG. 6 shows an example of a computing system for implementing certain aspects of the present technology.

FIG. 6 shows an example of computing system 600, which can be for example any computing device making up sensor distortion detection system for an IR camera 100, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1: A method for determining an accuracy of an infrared (IR) camera, the method comprising: receiving one or more images of a calibration harp captured by the IR camera, wherein the one or more images include a plurality of lines corresponding to a plurality of strings of the calibration harp; and determining a degree of distortion of the plurality of lines based on a distortion error coefficient, wherein the distortion error coefficient is computed based on edge points of the plurality of lines on the one or more images.

Aspect 2: The method of Aspect 1, wherein the distortion error coefficient is a root-mean-square (RMS) distance.

Aspect 3: The method of any of Aspects 1 to 2, wherein the distortion error coefficient is a difference between maximum and minimum of a non-linear line of the plurality of lines.

Aspect 4: The method of any of Aspects 1 to 3, wherein the calibration harp is connected to an electrical source whereby the plurality of lines give off heat due to the electrical resistance of the plurality of lines of the calibration harp, which can be captured by the IR camera.

Aspect 5: The method of any of Aspects 1 to 4, wherein each of the plurality of strings of the calibration harp correspond to one-pixel width.

Aspect 6: The method of any of Aspects 1 to 5, wherein the one or more images include images of the calibration harp taken from multiple angles.

Aspect 7: The method of any of Aspects 1 to 6, wherein the one or more images include images of each of four corners of the calibration harp.

Aspect 8: The method of any of Aspects 1 to 7, wherein the one or more images include images taken from images of the calibration harp at different distances and poses relative to the IR camera.

Aspect 9: The method of any of Aspects 1 to 8, further comprising: applying a post processing correction to the one or more images of the calibration harp received from the IR camera to compensate for the distortion error coefficient.

Aspect 10: The method of any of Aspects 1 to 9, wherein the calibration harp maintains the plurality of strings under tension, thereby ensuring the strings are straight.

Aspect 11: A method comprising: connecting a plurality of wires held under tension to an electrical current; capturing one or more images of the plurality of wires by an IR camera; evaluating the one or more images of the plurality of wires using a line fitting tool to result in a determined degree of distortion of the plurality of lines compared to a straight line; and repeating the capturing the one or more images and the evaluating the one or more images across a field of view of the IR camera.

Aspect 12: The method of Aspect 11, wherein the plurality of wires held under tension is a calibration harp.

Aspect 13: The method of any of Aspects 11 to 12, wherein the capturing the one or more images and the evaluating the one or more images across the field of view of the IR camera are repeated while positioning the calibration harp at different distances and poses relative to the IR camera.

Aspect 14: A system for determining an accuracy of an infrared (IR) camera, comprising: a storage configured to store instructions; a processor configured to execute the instructions and cause the processor to: receive one or more images of a calibration harp captured by the IR camera, wherein the one or more images include a plurality of lines corresponding to a plurality of strings of the calibration harp, and determine a degree of distortion of the plurality of lines based on a distortion error coefficient, wherein the distortion error coefficient is computed based on edge points of the plurality of lines on the one or more images.

Aspect 15: The system of Aspect 14, wherein the distortion error coefficient is a root-mean-square (RMS) distance.

Aspect 16: The system of any of Aspects 14 to 15, wherein the distortion error coefficient is a difference between maximum and minimum of a non-linear line of the plurality of lines.

Aspect 17: The system of any of Aspects 14 to 16, wherein the calibration harp is connected to an electrical source whereby the plurality of lines give off heat due to the electrical resistance of the plurality of lines of the calibration harp, which can be captured by the IR camera.

Aspect 18: The system of any of Aspects 14 to 17, wherein each of the plurality of strings of the calibration harp correspond to one-pixel width.

Aspect 19: The system of any of Aspects 14 to 18, wherein the one or more images include images of the calibration harp taken from multiple angles.

Aspect 20: The system of any of Aspects 14 to 19, wherein the one or more images include images of each of four corners of the calibration harp.

Aspect 21: The system of any of Aspects 14 to 20, wherein the one or more images include images taken from images of the calibration harp at different distances and poses relative to the IR camera.

Aspect 22: The system of any of Aspects 14 to 21, wherein the processor is configured to execute the instructions and cause the processor to: apply a post processing correction to the one or more images of the calibration harp received from the IR camera to compensate for the distortion error coefficient.

Aspect 23: The system of any of Aspects 14 to 22, wherein the calibration harp maintains the plurality of strings under tension, thereby ensuring the strings are straight.

Aspect 24: A non-transitory computer readable medium comprising instructions, the instructions, when executed by a computing system, cause the computing system to: receive one or more images of a calibration harp captured by the IR camera, wherein the one or more images include a plurality of lines corresponding to a plurality of strings of the calibration harp; and determine a degree of distortion of the plurality of lines based on a distortion error coefficient, wherein the distortion error coefficient is computed based on edge points of the plurality of lines on the one or more images.

Aspect 25: The computer readable medium of Aspect 24, the distortion error coefficient is a root-mean-square (RMS) distance.

Aspect 26: The computer readable medium of any of Aspects 24 to 25, the distortion error coefficient is a difference between maximum and minimum of a non-linear line of the plurality of lines.

Aspect 27: The computer readable medium of any of Aspects 24 to 26, the calibration harp is connected to an electrical source whereby the plurality of lines give off heat due to the electrical resistance of the plurality of lines of the calibration harp, which can be captured by the IR camera.

Aspect 28: The computer readable medium of any of Aspects 24 to 27, each of the plurality of strings of the calibration harp correspond to one-pixel width.

Aspect 29: The computer readable medium of any of Aspects 24 to 28, the one or more images include images of the calibration harp taken from multiple angles.

Aspect 30: The computer readable medium of any of Aspects 24 to 29, the one or more images include images of each of four corners of the calibration harp.

Aspect 31: The computer readable medium of any of Aspects 24 to 30, the one or more images include images taken from images of the calibration harp at different distances and poses relative to the IR camera.

Aspect 32: The computer readable medium of any of Aspects 24 to 31, wherein the computer readable medium further comprises instructions that, when executed by the computing system, cause the computing system to: apply a post processing correction to the one or more images of the calibration harp received from the IR camera to compensate for the distortion error coefficient.

Aspect 33: The computer readable medium of any of Aspects 24 to 32, the calibration harp maintains the plurality of strings under tension, thereby ensuring the strings are straight.

What is claimed is:

1. A method for determining an accuracy of an infrared (IR) camera, the method comprising:
    receiving image data captured by an IR camera, wherein the image data is descriptive of one or more lines corresponding to one or more strings of a calibration harp;
    analyzing a nonlinearity of the one or more lines of the image data;
    determining a degree of distortion of the one or more lines based on the nonlinearity of the one or more lines;
    connecting the one or more strings held under tension to an electrical current;
    capturing one or more images of the one or more strings by the IR camera;
    evaluating the one or more images of the one or more strings using a line fitting tool; and
    repeating the capturing the one or more images and the evaluating the one or more images across a field of view of the IR camera.

2. The method of claim 1, wherein the degree of distortion of the one or more lines is based on a difference between maximum and minimum of a curvature of a non-linear line of the one or more lines.

3. The method of claim 1, wherein the nonlinearity of the one or more lines of the image data is computed based on endpoints of the one or more lines of the image data.

4. The method of claim 1, wherein the degree of distortion of the one or more lines is based on a root-mean-square (RMS) distance between edge points of each of the one or more lines of the image data.

5. The method of claim 1, wherein the image data is descriptive of each of four corners of the calibration harp.

6. The method of claim 1, wherein the capturing the one or more images and the evaluating the one or more images across the field of view of the IR camera are repeated while positioning the calibration harp at different distances and poses relative to the IR camera.

7. The method of claim 1, wherein the line fitting tool includes a polynomial regression model.

8. A system for determining an accuracy of an infrared (IR) camera, comprising:
    a storage configured to store instructions; and
    a processor configured to execute the instructions and cause the processor to:
        receive image data captured by an IR camera, wherein the image data is descriptive of one or more lines corresponding to one or more strings of a calibration harp;
        analyze a nonlinearity of the one or more lines of the image data;
        determine a degree of distortion of the one or more lines based on the nonlinearity of the one or more lines, wherein the one or more strings are connected held under tension to an electrical current;
        capture one or more images of the one or more strings by the IR camera;
        evaluate the one or more images of the one or more strings using a line fitting tool; and repeat the capturing the one or more images and the evaluating the one or more images across a field of view of the IR camera.

9. The system of claim 8, wherein the degree of distortion of the one or more lines is based on a difference between maximum and minimum of a curvature of a non-linear line of the one or more lines.

10. The system of claim 8, wherein the nonlinearity of the one or more lines of the image data is computed based on endpoints of the one or more lines of the image data.

11. The system of claim 8, wherein the degree of distortion of the one or more lines is based on a root-mean-square (RMS) distance between edge points of each of the one or more lines of the image data.

12. The system of claim 8, wherein the image data is descriptive of each of four corners of the calibration harp.

13. The system of claim 8, wherein the capturing the one or more images and the evaluating the one or more images across the field of view of the IR camera are repeated while positioning the calibration harp at different distances and poses relative to the IR camera.

14. The system of claim 8, wherein the line fitting tool includes a polynomial regression model.

15. A non-transitory computer readable medium comprising instructions, the instructions, when executed by a computing system, cause the computing system to:
receive image data captured by an IR camera, wherein the image data is descriptive of one or more lines corresponding to one or more strings of a calibration harp;
analyze a nonlinearity of the one or more lines of the image data;
determine a degree of distortion of the one or more lines based on the nonlinearity of the one or more lines, wherein the one or more strings are connected held under tension to an electrical current;
capture one or more images of the one or more strings by the IR camera;
evaluate the one or more images of the one or more strings using a line fitting tool; and
repeat the capturing the one or more images and the evaluating the one or more images across a field of view of the IR camera.

16. The non-transitory computer readable medium of claim 15, wherein the degree of distortion of the one or more lines is based on a difference between maximum and minimum of a curvature of a non-linear line of the one or more lines.

17. The non-transitory computer readable medium of claim 15, wherein the nonlinearity of the one or more lines of the image data is computed based on endpoints of the one or more lines of the image data.

18. The non-transitory computer readable medium of claim 15, wherein the degree of distortion of the one or more lines is based on a root-mean-square (RMS) distance between edge points of each of the one or more lines of the image data.

* * * * *